United States Patent
Sham et al.

[19]

[11] Patent Number: 6,070,519

[45] Date of Patent: Jun. 6, 2000

[54] JUICE EXTRACTOR AND BEVERAGE MIXER APPARATUS

[76] Inventors: John C. K. Sham, Room 1508, Block C, 19 Broadwood Road, Hong Kong, The Hong Kong Special Administrative Region of the People's Republic of China; Kumkit Kunavong Vorakul, 8251/182 M001 Thungkru, Ratburna, Bangkok, Thailand

[21] Appl. No.: 09/212,102

[22] Filed: Dec. 15, 1998

[51] Int. Cl.[7] .............................. A47J 19/00; A23N 1/00
[52] U.S. Cl. .............................. 99/348; 99/357; 99/502; 99/503; 99/501
[58] Field of Search ........................ 99/348, 357, 501, 99/503, 502, 505, 506, 508

[56] References Cited

U.S. PATENT DOCUMENTS

| | | |
|---|---|---|
| D. 290,329 | 6/1987 | Bulto ................................. D7/49 |
| D. 366,984 | 2/1996 | Hsu ................................... D7/376 |
| 1,509,981 | 9/1924 | Rice . |
| 1,563,413 | 12/1925 | Whitcomb . |
| 1,949,675 | 3/1934 | Bush . |
| 2,003,259 | 5/1935 | Gilbert et al. ....................... 99/501 X |
| 2,074,708 | 3/1937 | Smith ................................ 99/501 X |
| 2,176,377 | 10/1939 | Gamble . |
| 2,269,853 | 1/1942 | Knapp ................................ 99/501 |
| 2,315,018 | 3/1943 | Lawrence ......................... 99/501 |
| 2,552,572 | 5/1951 | Mikina . |
| 3,566,939 | 3/1971 | Hubrich . |
| 4,240,338 | 12/1980 | McClean ........................... 99/501 |
| 4,309,942 | 1/1982 | Da Silva, Jr. ..................... 99/501 |
| 5,193,447 | 3/1993 | Lucas et al. ...................... 99/508 |
| 5,257,575 | 11/1993 | Harrison et al. ................. 99/511 |
| 5,355,784 | 10/1994 | Franklin et al. ................. 99/492 |

*Primary Examiner*—Reginald L. Alexander
*Attorney, Agent, or Firm*—Peter S. Canelias

[57] ABSTRACT

An upper extractor module includes a cover and a juice extractor fluted dome and trough. A pulp filter filters the juice which flows into a lower extension conduit. An intermediate module has a compartment in fluid isolation from the juice extraction compartment. A motor, drive gears and switch are in the intermediate compartment for rotationally driving the extractor. A pitcher forms a lower module on which the intermediate module fits. The juice flows into the pitcher through the intermediate module via the extension. A paddle depends from the intermediate module and is driven by the motor and gears simultaneously with the extractor, but at a higher speed for mixing beverages in the pitcher formed from the extracted juice and other ingredients such as water, sweeteners and so on. Different extractors may be attached for different size fruits. A lid may be attached over the pitcher for juice/beverage storage.

9 Claims, 5 Drawing Sheets

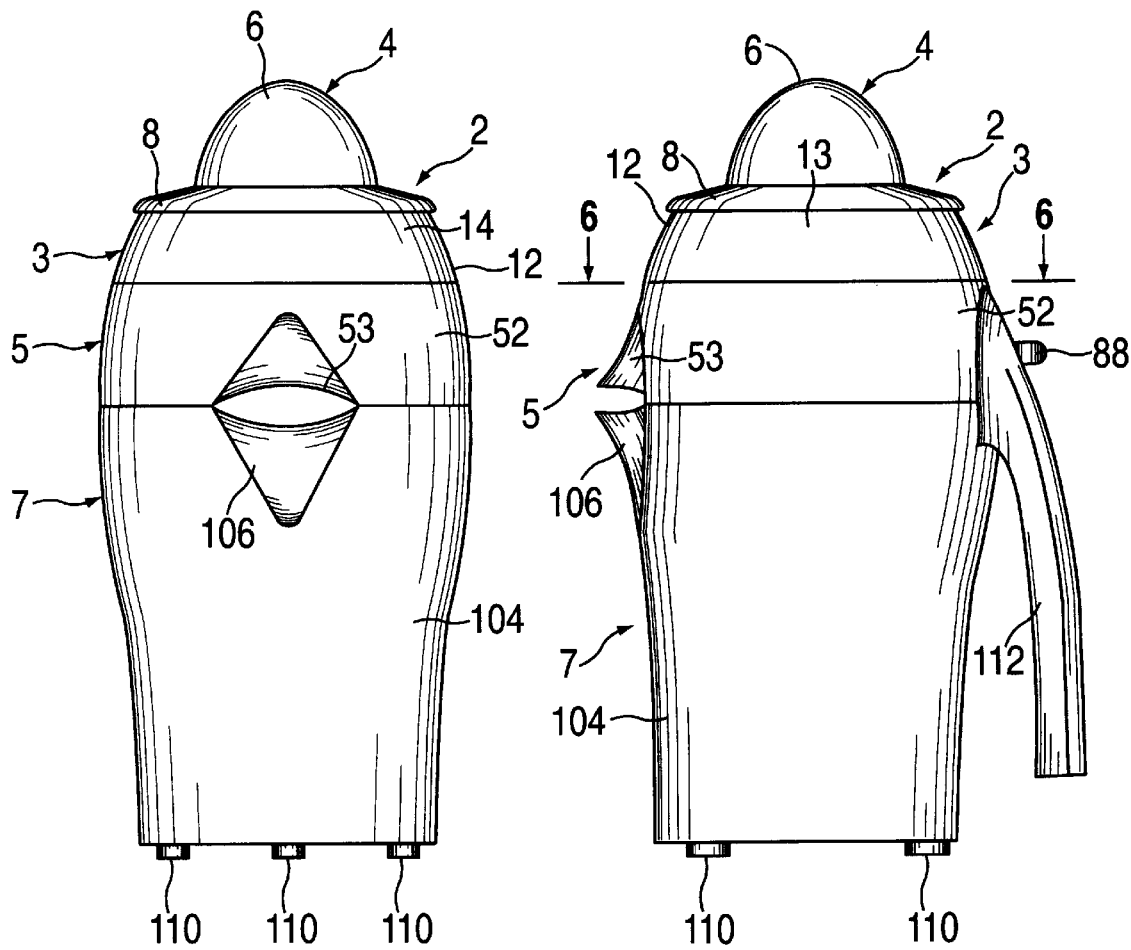

JUICE EXTRACTOR AND BEVERAGE MIXER APPARATUS

BACKGROUND OF THE INVENTION

1. Field of the Invention

The present invention relates to juice extractors for extracting juice from citrus fruit for example and a mixer device for mixing the extracted juice with ingredients to make juice beverages.

2. Description of Related Art

Juice extractors are known and comprise a fluted undulating convex tapered somewhat generally cone shaped member that tapers to an apex. The member extends from a surrounding trough having a pouring spout. Citrus fruit such as oranges, lemons, and grapefruit are manually pressed against the tapered member and rotated thereagainst to ream the pulp and juice from the fruit which collects in the trough. Such extractors are typically molded thermoplastic.

Improvements to the above extractors include drive motors to rotate the reaming tapered member and other features. For example, U.S. Pat. No. 2,552,572 discloses a motor and drive gears for rotating the tapered reaming member at cyclically varying velocities. In U.S. Pat. No. 5,193,447, a citrus juicer includes a motor driven cone surrounded by a strainer. An annular gap is in the region between the cone and strainer and whose cross section is changed by an adjusting device to predetermine the pulp content of the juice.

In U.S. Pat. No. 1,509,981, a beverage shaker includes a fluted dome and an upright body having a spout and a handle. The body terminates at the top in a wide mouth rim. The dome projects into the interior of the vessel to promote mixing when ingredients and ice are shaken. Liquid that passes into the interior of the dome drains out through an opening.

A separate part is formed with breast and neck portions. The breast portion fits over the rim. The neck receives a top. An intermediate part contains the dome. The dome depends within the wide breast portion. The intermediate part is inverted and placed in the mouth of the body so the dome is upright. The dome part is a fruit squeezer with the juice passing from the bowl formed by the inverted breast through openings into the body of the vessel. Ice or liquids may be introduced into the wide mouth upon removing of the breast. To mix the liquids and/or ice the device is manually shaken.

U.S. Pat. No. 1,563,413 discloses a shaker for mixing fruit juices with other liquids and ice. This too is a manually shaken device. U.S. Pat. No. 2,176,377 discloses a strainer and juicer for pitcher tops and the like. U.S. Pat. No. 3,566,939 discloses a wiper removably coupled to a reamer of a fruit juice extractor for rotation therewith. Means selectively adjust the height of the wiper above the surface of the juice strainer. The pulp content varies in accordance with the height of the wiper above the juice strainer.

U.S. Pat. No. 4,240,338 discloses a citrus fruit juice extractor for attachment to a food processor. The extractor is driven by the processor motor which can not operate unless the trough-like member of the extractor is in a predetermined rotational relationship with the food processor base and container.

Other juice extractors are disclosed in U.S. Pat. Nos. 4,309,942, 5,355,784, DE 366,984, DE 290,329 and 1,949,675, some of which include motorized extractors and containers beneath the extractor for collecting juices.

The present invention relates to a problem not addressed by the aforementioned patents. While the extractors are disclosed as including motors for rotating the reamers, any mixing of the juices in the containers thereof must be done by manual shaking and the like. The present invention is a recognition of a need for an improvement in such devices.

SUMMARY OF THE INVENTION

In accordance with the illustrative embodiments demonstrating features and advantages of the present invention, there is provided a juice extractor and beverage mixing apparatus comprising a juice extraction module; a beverage mixing module; and a drive module intermediate the extraction module and the mixing module for extraction of juice from fruit and for mixing the extracted juice with additional ingredients to produce a beverage in the mixing module.

A juice extractor and beverage mixer according to a further aspect of the present invention comprises releasably attached and fluid coupled first and second compartments. A juice extractor device extracts juice from fruit inserted in the first compartment. A beverage mixing device is coupled to the second compartment, the second compartment receives the extracted juice from the first compartment and receives beverage ingredients, the mixing device mechanically stirring and mixing a juice beverage from the received juice and ingredients.

In one aspect, electrically operated means are coupled to the compartments for operating the extractor and mixing devices.

In a further aspect, a third compartment is included releasably coupled to the first and second compartments forming a plurality of modules, electrically operated drive means are in the third compartment in substantial fluid isolation from the first and second compartments for operating the extractor and mixing devices.

In a further aspect, the drive means includes first and second drive shafts rotatable driven by a motor, the first drive shaft extending into the first compartment for operating the juice extractor device, the second drive shaft being coupled to the second compartment for operating the mixing device.

In a further aspect, gear means in the third compartment are responsive to the motor for operating the first and second drive shafts and respective extractor and mixing devices at corresponding rotational speeds.

In a further aspect, the third compartment is in substantial fluid isolation relative to the first and second compartments.

In a still further aspect, the motor and gear means include means for operating the first drive shaft at a different rotational speed than the second drive shaft.

Preferably, the motor and gear means include means for operating the first drive shaft at a slower speed than the second drive shaft.

The extractor preferably comprises a convex fruit receiving member with a fluted undulating outer fruit receiving surface terminating at an apex, the mixer device comprising a paddle, the drive means for selectively rotating the paddle and the fruit receiving member.

In a further aspect, transmission means are responsive to the motor for rotating the paddle and fruit receiving member simultaneously.

Preferably the drive means includes transmission means for rotating the fruit receiving member at a slower speed than the paddle.

In a further aspect, the third compartment is coupled to the first and second compartments, drive means are in the third compartment for operating the extractor device and the mixing device, the compartments each comprising corresponding interengaged housing portions forming corresponding modules Preferably, the housing portions are releasably interengaged. Also, preferably a pouring spout is formed in the second compartment housing portion and the third compartment includes means juxtaposed with the spout when engaged with the second compartment for providing an overfill gap for liquid in the second compartment.

In a further aspect, the first compartment forms a module comprising a lid and a trough for receiving and enclosing the extractor, an intermediate housing portion forms a modular third compartment for receiving the electrically operated means and a pitcher having a handle and a pouring spout forms a module comprising the second compartment.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein:

FIG. 1 is a plan view of the mixer apparatus according to an embodiment of the present invention;

FIG. 2 is a front elevation view of the apparatus of FIG. 1;

FIG. 3 is a side elevation view of the apparatus of FIG. 1;

DETAILED DESCRIPTION OF THE PREFERRED EMBODIMENTS

Figure 4:
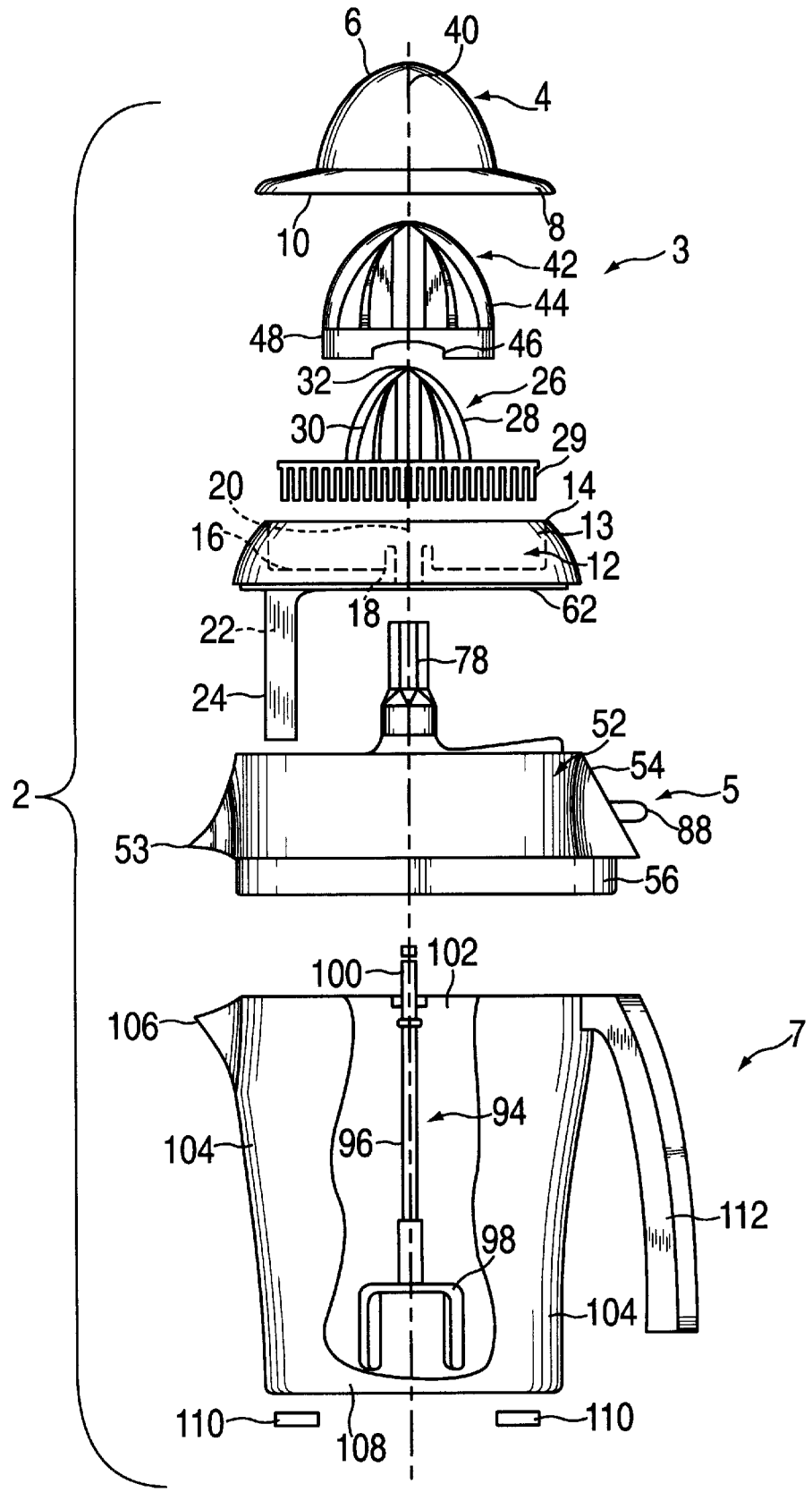
FIG. 4 is an exploded side elevation view, partially in section, of the apparatus of FIG. 1.

In the figures, apparatus 2 includes a juice extraction and collection module 3, a drive module 5 and a mixing module 7. The module 3 includes a preferably molded thermoplastic transparent cover 4 and juice collector 12. The cover 4 comprises a hollow cone-shaped dome 6 and an outer peripheral flange 8. The flange terminates in lip 10.

The juice collector 12 comprises a housing 13 and extractor 26. The cover 4 lip 10 engages juice collector 12 housing 13 annular rim 14. Collector 12 housing 13 is preferably one piece molded thermoplastic material and has an annular trough 16 formed by an upright outer wall and a central upright cylindrical collar 18, FIGS. 5 and 7, defining a central bore 20. An elongated arcuate bore 22, FIG. 6, is in the trough 16. An extension 24 depends from the trough 16. Bore 22 passes through the extension 24. The housing 13 and cover 4 form a first juice extraction compartment 15.

The juice extractor 26, FIG. 4, is located in the compartment 15 and is preferably one piece molded thermoplastic material. The extractor 26 comprises a conventional fluted dome 28 with undulations 30 forming fruit reaming ridges and troughs that terminate at apex 32. Extractor 26, FIGS. 5 and 7, has a bottom wall 34 and an outer wall 36 forming a trough 38 surrounding the dome 28. A plurality of fingers 29 depend from outer wall 36 forming a pulp filter. In the alternative, a screen structure may also form a filter in the bottom wall of trough 38, or, in the alternative, the filter may comprise any convenient apertured arrangement for filtering the pulp from the juice.

The extractor 26 rotates relative to housing 13. The trough 38 fits within the trough 16 of the housing 13. A juice drainage opening (not shown) in the extractor trough 38 bottom wall 34 coincides with the bore 22. Juice collecting in the trough 38 from reamed fruit flows through the drainage opening into the bore 22 through the juice drainage extension 24. The collar 18 is centrally within the dome 28 on axis 40. Juice is extracted from citrus fruit by the rotating extractor dome 28 in the module 3 as described below.

A second larger optional hollow extractor 42, releasably fits over the extractor 26 dome 28. The inner smaller extractor 26 may be for use with lemons or oranges and the extractor 42 may comprise different extractors of different sizes for use with grapefruit, for example. The extractor 42 has a fluted fruit reaming dome 44 and a recess 46 in its lower rim 48. The recess 46 mates with a boss (not shown) in the extractor 26 trough 38. The recess 46 and mating boss (not shown) rotationally fixedly secure extractor 42 to the extractor 26 so that rotation of the extractor 26 about axis 40 rotates the extractor 42. The rim 48 mates about a central upstanding boss 50 in the extractor 26, FIG. 5.

Drive module 5 comprises a molded two piece thermoplastic annular housing 52. Housing 52 has an upper member 54 which mates with and is fixed to lower member 56, FIGS. 5 and 7, by screws 57. The housing 52 has a spout portion 53. The members 54 and 56 form a compartment 58. The members 54 and 56 include a conduit 60 for receiving the extension 24 therethrough. The collector 12 housing 13, FIG. 4, has a lower lip 62 which mates with and is received in an annular recess in the housing member 54.

Figure 5:
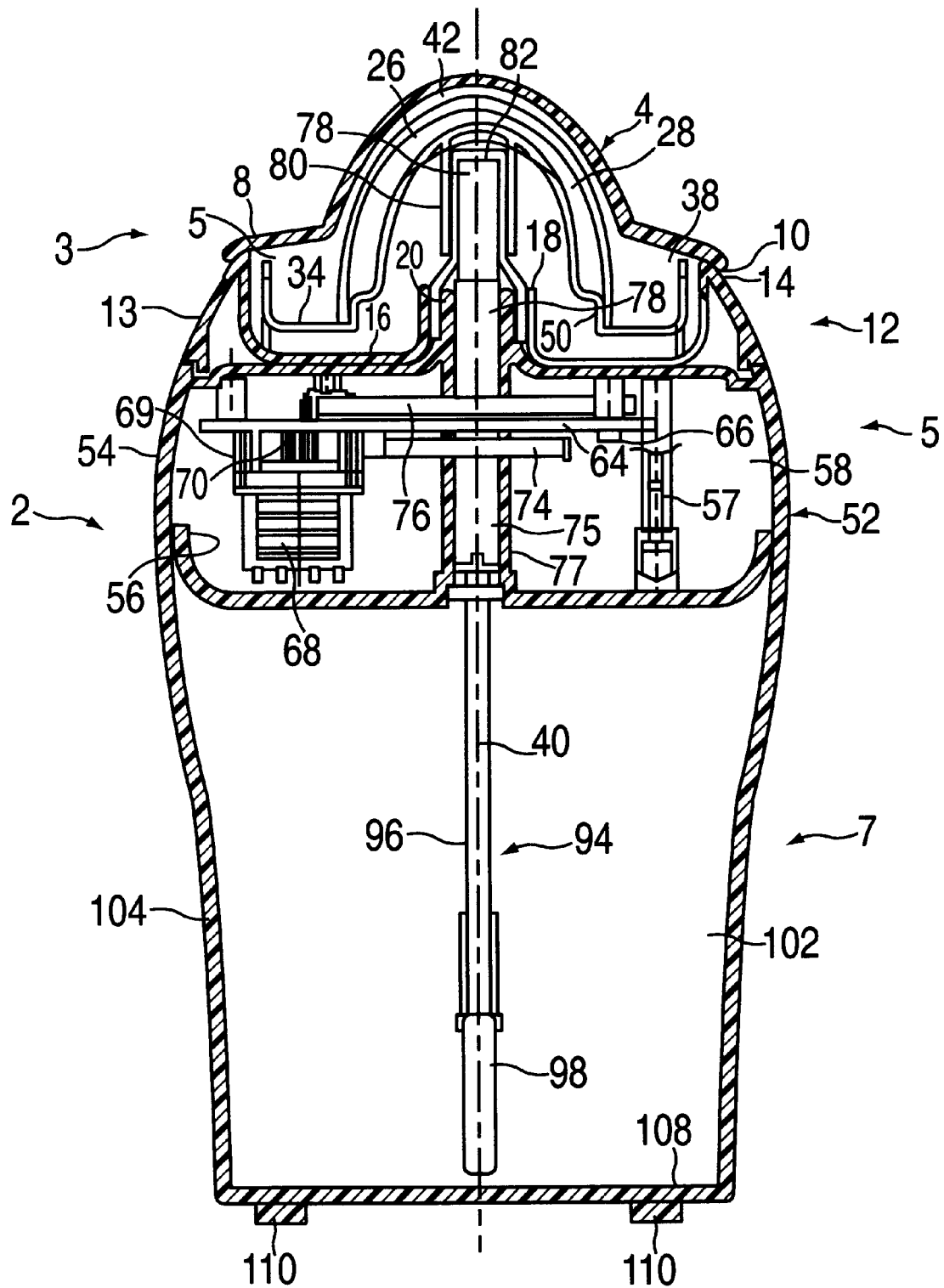
FIG. 5 is a side elevation sectional view of the apparatus of FIG. 1 taken along lines 5—5 of FIG. 1.
Figure 6:
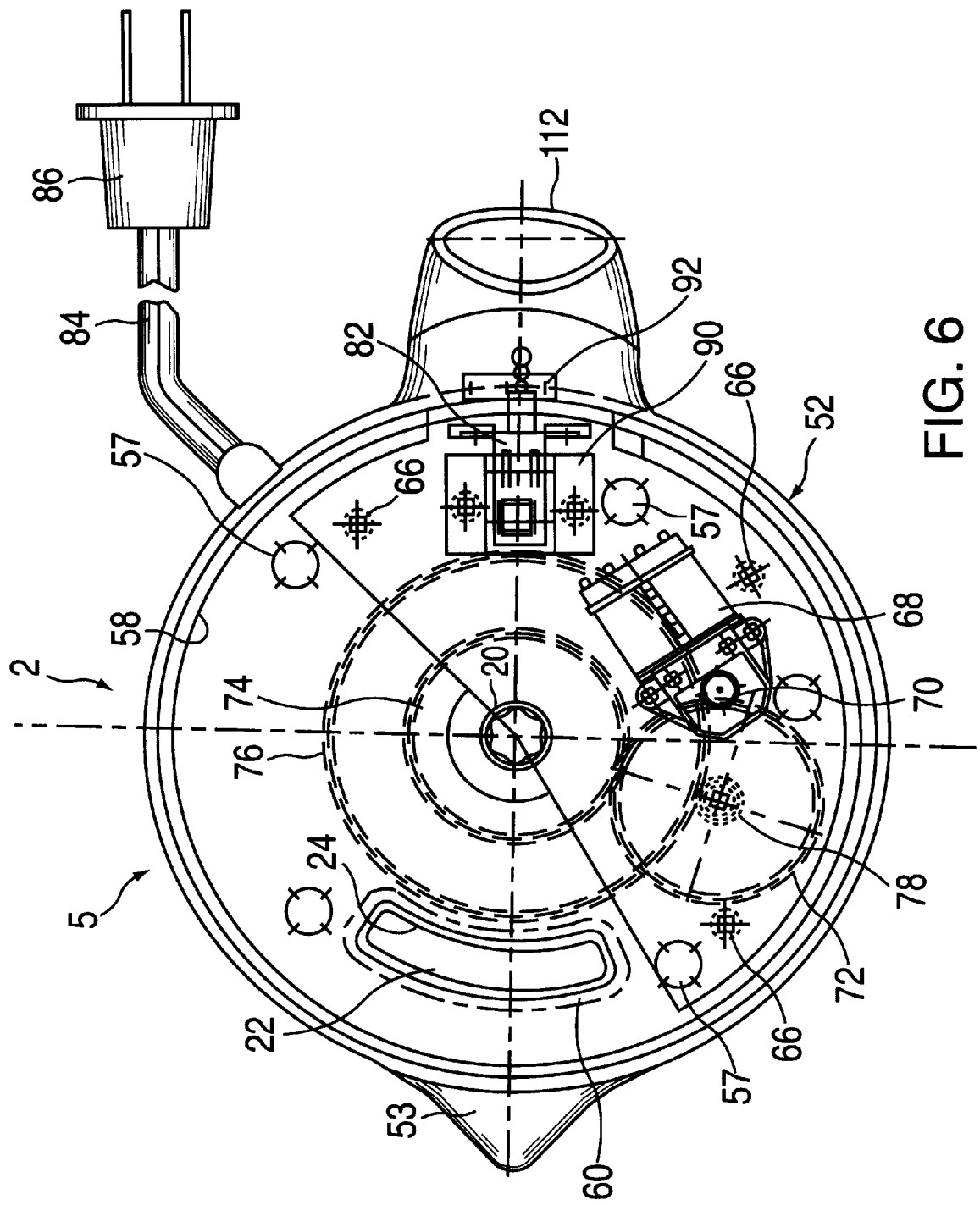
FIG. 6 is a plan sectional view of the apparatus of FIG. 3 taken along lines 6—6.
Figure 7:
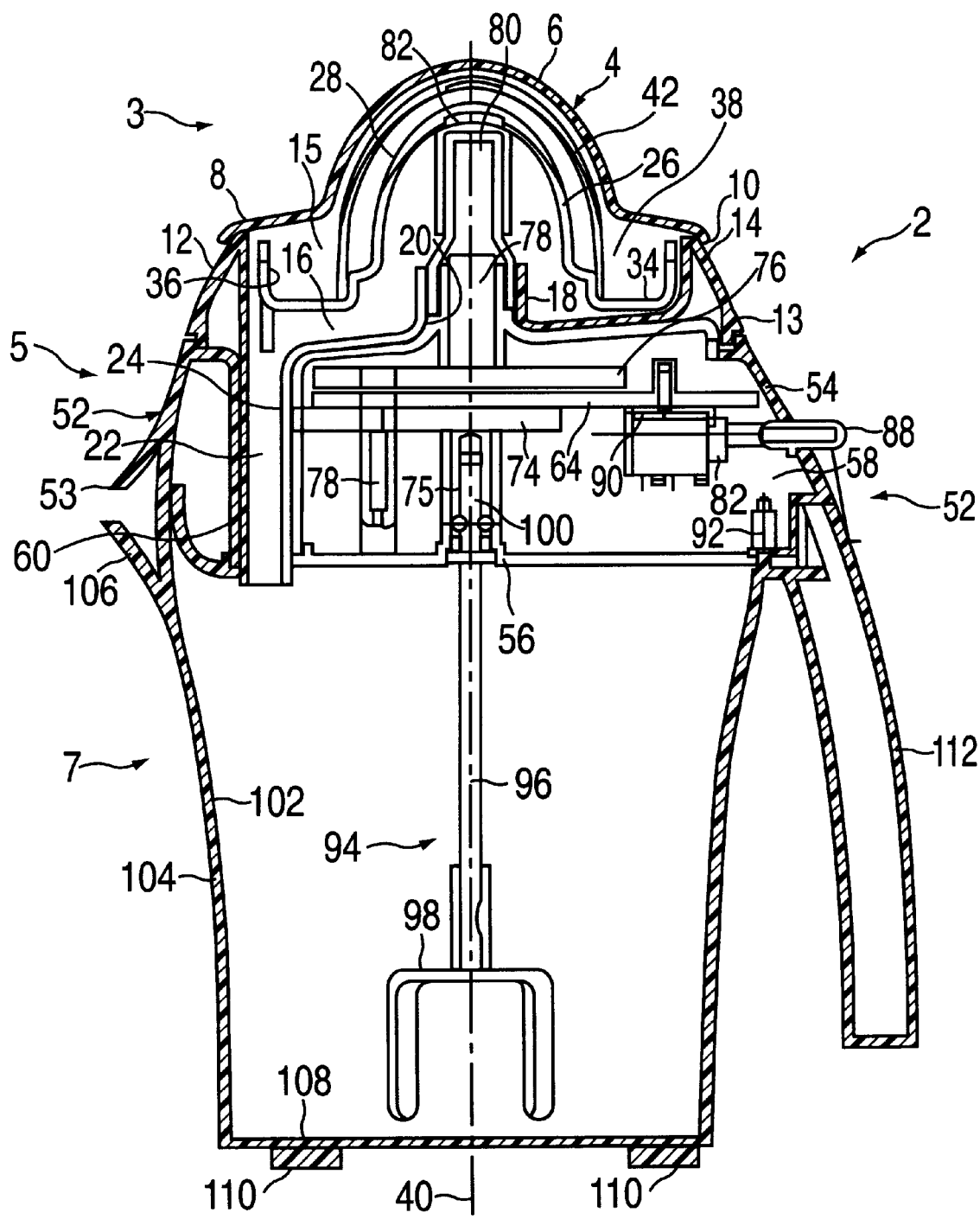
FIG. 7 is a side elevation sectional view of the apparatus of FIG. 1 taken along lines 7—7.

In FIGS. 5–7, a mounting plate 64 is secured to housing 52 member 54 by screws 66. Motor 68 is secured to the plate 64 by screws 69. Motor 68 has a shaft to which pinion gear 70, FIG. 6, is secured. Gear 70 drives transmission gear 72 which in turn drives mixing gear 74. Pinion gear 70 drives extraction gear 76. The two gears 74 and 76 are driven at different speeds, e.g., 300–600 rpm and 30–80 rpm, respectively in this embodiment. Gear 72 has a shaft mounted in bearing 78. Gear 76 drives shaft 78 which rotationally drives depending sleeve 80, FIG. 5, in extractor 26, preferably about 30–80 rpm. Shaft 78 has a hexagonal portion 78' which mates with a similar bore in sleeve 80. An adapter 82 may be placed over the shaft 78 for mating with the sleeve 80. The adapter may also fit in the collar 18 bore 20.

Gear 74 drives depending hollow shaft 75 with a hexagonal bore. Shaft 75 has a circular cylindrical outer surface located in bearing sleeve 77 integral and one piece with housing member 56.

On/off switch 82 is in compartment 58 and secured to plate 64. The switch 82 connects power to motor 68 via plug 86 and line 84, FIG. 6. A push button 88 operates the switch 82. The switch 82 is mounted to plate 64 by mount 90. A microswitch 92, FIG. 6, is included to provide a safety interlock to disable switch 82 unless module 5 properly engages module 7. This engagement activates switch 92 which enables switch 82 to supply power to the motor 68.

FIGS. 4, 5 and 7, a paddle 94 includes a shank 96, a bifurcated paddle member 98 and a coupler 100 which mates with the drive shaft 75. The paddle 94 depends from the module 5 into the compartment 102 of module 7. The compartment 102 is formed by container 104, preferably transparent molded thermoplastic. Container 104 forms a pitcher with a pouring spout 106 and handle 112. The container 104 has a bottom wall 108 supported on three soft thermoplastic or elastomeric base pads 110. The paddle 94 depends into the compartment 102 adjacent to the bottom wall 108. Thus the extractor 26 is driven preferably at a lower speed than the mixer paddle 94.

The handle 112 is molded thermoplastic and is attached to the container 104. The intermediate housing 52 nests within the container 104 upper rim.

The intermediate compartment 58 is in fluid isolation with respect to the module 3 compartment 13 and the container 104 compartment 102. Thus the motor and switch in this compartment 58 does not receive any liquid from the other compartments 13 and 102. The extension 24 passes the juice from the upper compartment 13 to the lower compartment 102 bypassing the intermediate compartment 58.

In operation, the button 88 is depressed turning on the motor 68. Microswitch 92 is activated at this time and enables switch 82. This action drives the extractor 26 and the paddle 94 simultaneously. The extractor 26 is preferably driven at a slower speed than the paddle 94 which is used for mixing beverages, e.g., lemonade, orangeade and so on, in the container 104 compartment 102. Various ingredients for a beverage such as water, honey or sugar, ice and so on are added to the compartment 102 by lifting the intermediate module 5 off of the lower module 7 exposing a wide mouth opening to the module 7 pitcher-like compartment 102.

After the ingredients are added, the modules 3 and 5 are place over the lower module 7 enclosing the compartment 102. The cover 4 is removed and the switch 82 activated to operate the motor 68. This rotates the extractor 26 (and extractor 42 if in place). Fresh fruit is then placed against the dome of the extractor and juice therefrom flows into the compartment 102 through the extension 24, bypassing the module 5 compartment.

At the same time, the paddle 94 mixes the beverage as the juice flows into the compartment. To pour the beverage, the intermediate and upper modules 5 and 3, respectfully, are lifted off of the container 104 which is now an open top pitcher.

The module 5 spout portion 53 is spaced from spout 106 of lower module 7, FIG. 2. This spacing permits liquid to escape from compartment 102 more easily in case of over filling of the compartment 102.

The modules 3, 5 and 7 are easily separated for cleaning of the components thereof. The extractor 26 (and extractor 42) are also easily removed for cleaning. The paddle 94 is also easily removed for cleaning.

The electronics in drive module 5 are generally in fluid isolation from the other modules. In other embodiments, module 5 may be sealed with gaskets (not shown) relative to the other modules. Module 5 does not need internal cleaning and may be easily cleaned externally. The drive shafts 78 and 94 may be optionally fluid sealed to the module 5 housing 52 members 54 and 56, FIGS. 5 and 7, by seals (not shown).

It will occur to one of ordinary skill that various modifications may be made to the disclosed embodiments. The embodiments disclosed are by way of illustration and not limitation. It is intended that the scope of the invention is as defined by the appended claims.

For example, while the extractor and mixing paddle are rotated simultaneously, they may be rotated selectively at different times. A clutch device (not shown) may be included for selectively coupling either the extractor or the mixing paddle to the motor. Multiple switches and motors may also selectively operate the mixing or extracting functions. Also, the speeds of the extractor and paddles may be varied by a variable or step speed control including a potentiometer or a resistor network (not shown), for example, for selecting a desired speed for the extractor and for the paddle.

Also, in the alternative, although not presently so designed, the module 3 may be configured to be placed directly on the module 7 for manual operation of the extractor and for manually mixing the beverage if desired without the module 5 in place Module 5 may be used to solely mix a beverage without use of the extractor simply by placing ingredients in the compartment 102 and operating the paddle 94. In the alternative, the extractor may be used to provide fruit juice without adding ingredients to the mixing module, if desired, to provide a simple juice extractor.

Further a module (not shown) similar to module 5, may be provided to either selectively provide only the mixing function or the extraction function without doing both simultaneously. For example, such a module has one drive shaft extending therefrom. As a mixing module, the paddle is attached to the drive shaft and used to mix ingredients in the beverage compartment 102. The module may be inverted so the drive shaft is upright for driving the extractor in the extractor module. The drive shaft may have selected different speeds, but mates with a paddle and extractor with the same coupling.

While a motor is preferably employed to drive the extractor and paddle, it will occur that a manually operated crank in the drive module can perform the same function.

What is claimed is:

1. A juice extractor and beverage mixer apparatus comprising:

releasably attached and fluid coupled first and second compartments;

a juice extractor device for extracting juice from fruit inserted in the first compartment;

a beverage mixing device coupled to the second compartment, the second compartment for receiving the extracted juice from the first compartment and for receiving beverage ingredients, the mixing device for mechanically stirring and mixing a juice beverage in the second compartment from the received juice and ingredients;

electrically operated means coupled to the first and second compartments for operating the extractor and mixing devices;

a third compartment releasably coupled to the first and second compartments forming a plurality of modules, electrically operated drive means in the third compartment in substantial fluid isolation from the first and second compartments for rotationally operating the extractor and mixing devices;

the drive means includes first and second drive shafts rotatably driven by a motor, the first drive shaft being coupled to the first compartment for operating the juice extractor device, the second drive shaft being coupled to the second compartment for receiving and operating the mixing device;

gear means in the third compartment responsive to the motor for operating said first and second drive shafts and respective extractor and mixing devices at corresponding rotational speeds;

the motor and gear means including means for operating the first drive shaft at a different rotational speed than the second drive shaft.

2. The mixer apparatus of claim 1 wherein the motor and gear means include means for operating the first drive shaft at a slower speed than the second drive shaft.

3. A juice extractor and beverage mixer apparatus comprising:

releasably attached and fluid coupled first and second compartments;

a juice extractor device for extracting juice from fruit inserted in the first compartment;

a beverage mixing device coupled to the second compartment, the second compartment for receiving the extracted juice from the first compartment and for receiving beverage ingredients, the mixing device for mechanically stirring and mixing a juice beverage in the second compartment from the received juice and ingredients;

electrically operated means coupled to the compartments for operating the extractor and mixing devices;

a third compartment releasably coupled to the first and second compartments forming a plurality of modules;

electrically operated drive means in the third compartment in substantial fluid isolation from the first and second compartments for rotationally operating the extractor and mixing devices;

the extractor comprising a convex fruit receiving member with a fluted undulating outer fruit receiving surface terminating at an apex, the mixer device comprising a paddle, the drive means for selectively rotating the paddle and the fruit receiving member;

the drive means including transmission means for rotating the fruit receiving member at a slower speed than the paddle.

4. A juice extractor and beverage mixer apparatus comprising:

releasably attached and fluid coupled first and second compartments;

a juice extractor device for extracting juice from fruit inserted in the first compartment;

a beverage mixing device coupled to the second compartment, the second compartment for receiving the extracted juice from the first compartment and for receiving beverage ingredients, the mixing device for mechanically stirring and mixing a juice beverage in the second compartment from the received juice and ingredients;

a third compartment coupled to the first and second compartments, drive means in the third compartment for operating the extractor device and the mixing device, each compartment comprising corresponding interengaged housing portions forming corresponding modules;

a pouring spout formed in the second compartment housing portion;

the third compartment including means juxtaposed with the spout when engaged with the second compartment for providing an overfill gap from liquid in the second compartment.

5. A juice extractor and beverage mixer apparatus comprising:

releasably attached and fluid coupled first and second compartments;

a juice extractor device for extracting juice from fruit inserted in the first compartment;

a beverage mixing device coupled to the second compartment, the second compartment for receiving the extracted juice from the first compartment and for receiving beverage ingredients, the mixing device for mechanically stirring and mixing a juice beverage in the second compartment from the received juice and ingredients;

electrically operated means coupled to the compartments for operating the extractor and mixing devices;

the first compartment forming a module comprising a lid and a trough for receiving and enclosing the extractor, an intermediate housing portion forming a modular third compartment for receiving the electrically operated means and a pitcher having a handle and a pouring spout forming a module comprising the second compartment.

6. The mixer apparatus of claim 5 wherein the trough includes a juice drain extension passing though the intermediate housing portion in fluid isolation with the third compartment and in fluid communication with the second compartment.

7. The mixer apparatus of claim 6 wherein the intermediate housing portion includes means for releasably enclosing the pouring spout.

8. A juice extractor and beverage mixer apparatus comprising:

releasably attached and fluid coupled first and second compartments;

a juice extractor device for extracting juice from fruit inserted in the first compartment;

a beverage mixing device coupled to the second compartment, the second compartment for receiving the extracted juice from the first compartment and for receiving beverage ingredients, the mixing device for mechanically stirring and mixing a juice beverage in the second compartment from the received juice and ingredients;

electrically operated means coupled to the compartments for operating the extractor and mixing devices;

a plurality of different juice extractors each for releasably interchangeable engagement with the electrically operated means for extracting juice from a corresponding different size fruit.

9. A juice extractor and beverage mixer apparatus comprising:

a modular housing having first, second and third releasably engaged compartments;

a juice extractor device in the first compartment and comprising a rotatably secured convex member with a fluted undulating fruit receiving surface having ridges and troughs terminating at an apex for manually receiving fruit and extracting juice from received fruit;

a beverage mixing device including a rotatably secured mixing paddle in the second compartment, the second compartment for receiving the extracted juice from the first compartment and for receiving beverage ingredients, the mixing device for mixing a juice beverage from the received juice and ingredients;

drive means in the third compartment intermediate the first and second compartments for rotatably driving the convex member and the paddle;

the drive means including means for rotatably driving the paddle and convex member simultaneously.

* * * * *